United States Patent
Farrell et al.

(10) Patent No.: US 6,862,634 B2
(45) Date of Patent: Mar. 1, 2005

(54) MECHANISM TO IMPROVE PERFORMANCE IN A MULTI-NODE COMPUTER SYSTEM

(75) Inventors: Jeremy J. Farrell, Campbell, CA (US); Kazunori Masuyama, Kanazawa (JP); Sudheer Miryala, San Jose, CA (US); Patrick Conway, Los Altos, CA (US)

(73) Assignee: Fujitsu Limited, Kanagawa (JP)

(*) Notice: Subject to any disclaimer, the term of this patent is extended or adjusted under 35 U.S.C. 154(b) by 105 days.

(21) Appl. No.: 10/150,276

(22) Filed: May 17, 2002

(65) Prior Publication Data
US 2003/0007457 A1 Jan. 9, 2003

Related U.S. Application Data

(60) Provisional application No. 60/301,886, filed on Jun. 29, 2001.

(51) Int. Cl.$^7$ ................................................ G06F 3/00
(52) U.S. Cl. ........................ 710/38; 709/201; 709/223; 712/32
(58) Field of Search ............................ 710/5, 36, 37, 710/38; 709/201, 223; 712/32

(56) References Cited

U.S. PATENT DOCUMENTS

| | | | |
|---|---|---|---|
| 5,175,839 A | | 12/1992 | Ikeda et al. |
| 5,465,338 A | * | 11/1995 | Clay ............................ 395/310 |
| 5,561,780 A | | 10/1996 | Glew et al. |
| 5,592,671 A | | 1/1997 | Hirayama |
| 5,727,150 A | | 3/1998 | Laudon et al. |
| 5,761,460 A | * | 6/1998 | Santos et al. ................ 395/309 |
| 5,829,032 A | | 10/1998 | Komuro et al. |
| 5,859,985 A | * | 1/1999 | Gormley et al. ............ 395/287 |
| 5,887,134 A | * | 3/1999 | Ebrahim ...................... 395/200 |
| 6,006,255 A | | 12/1999 | Hoover et al. |
| 6,014,690 A | | 1/2000 | VanDoren et al. |
| 6,026,472 A | | 2/2000 | James et al. |
| 2002/0184345 A1 | | 12/2002 | Masuyama et al. |
| 2002/0186711 A1 | | 12/2002 | Masuyama et al. |
| 2003/0005070 A1 | | 1/2003 | Narasimhamurthy et al. |
| 2003/0005156 A1 | | 1/2003 | Miryala et al. |
| 2003/0007457 A1 | | 1/2003 | Farrell et al. |
| 2003/0007493 A1 | | 1/2003 | Oi et al. |
| 2003/0023666 A1 | | 1/2003 | Conway et al. |

OTHER PUBLICATIONS

Abandah, Gheith A., and Davidson, Edward S., Effects of Architectural and Technological Advances on the HP/Convex Exemplar's Memory and Communication Performance, IEEE 1998—1063–6897, pp. 318–329.

(List continued on next page.)

*Primary Examiner*—Fritz Fleming
*Assistant Examiner*—Alan Chen
(74) *Attorney, Agent, or Firm*—Fenwick & West LLP

(57) ABSTRACT

In a distributed multi-node computer system each switch provides routing of data packets between CPU nodes, I/O nodes, and memory nodes. Each switch is connected through a corresponding I/O node to a network interface controller (NIC) for transferring data packets on a network. Each NIC is memory-mapped. Part of the system address space forms a send window for each NIC connected to a corresponding switch. A mechanism for controlling data packets transmission is defined such that each CPU write to a NIC send window is atomic and self-defining, i.e., it does not rely on immediately preceding write to determine where the data packet should be sent. Using "address aliasing", CPU writes to the aliased part of the NIC send window are always directed to the NIC connected to the same switch as the CPU which did the write.

15 Claims, 5 Drawing Sheets

OTHER PUBLICATIONS

Falsafi, Babak and Wood, David A., Reactive NUMA: A Design for Unifying S–COMA and CC–NUMA, ISCA '97, CO, USA, pp. 229–240.

Geralds, John in Silicon Valley. Sun enhances partitioning in Starfire Unix server. Dec. 8, 1999 VNU Business Publishing Limited [retrieved on Apr. 11, 2001]. Retrieved from the internet: URL:http://www.vnunet.com/print/104311.

IBM. The IBM NUMA–Q enterprise server architecture. *Solving issues of latency and scalability in multiprocessor systems.* Jan. 19, 2000, 10 pages.

Lovett, Tom and Clapp, Russell; StiNG: A CC–NUMA Computer System for the Commercial Marketplace; ISCA '95, PA, USA, pp. 308–317.

Servers White Paper. *Sun Enterprise™1000 Server: Dynamic System Domains.* Sun Microsystems, Inc., Palo Alto, CA, USA. 2001. [retrieved on Apr. 11, 2001]. Retrieved from the internet: URL:http://www.sun.com/servers/white–papers/domains.html?pagestyle=print.

Unisys White Paper. *Cellular Multiprocessing Shared Memory: Shared Memory and Windows*, Sep. 2000, pp. 1–16.

Willard, Christopher, and IDC White Paper. *Superdome—Hewlett–Packard Extends Its High–End Computing Capabilities*, (2000), pp. 1–20.

* cited by examiner

US 6,862,634 B2

MECHANISM TO IMPROVE PERFORMANCE IN A MULTI-NODE COMPUTER SYSTEM

RELATED APPLICATION

This application claims priority under 35 U.S.C. § 119(e) from U.S. provisional application No. 60/301,886, entitled "HARDWARE MECHANISM TO IMPROVE PERFORMANCE IN A MULTI-NODE COMPUTER SYSTEM", filed on Jun. 29, 2001 by Jeremy J. Farrell, Kazunori Masuyama, Sudheer Miryala, and Patrick N. Conway, which provisional application is incorporated herein by this reference in its entirety.

FIELD OF THE INVENTION

The present invention relates generally to transferring data packets in a multi-node computer system, and more specifically to a system and method for routing data packets through a local network interface controller.

BACKGROUND OF THE INVENTION

Conventional operating systems (OS) are commonly designed on the assumption that the computer system on which they run is symmetrical. In a Symmetrical Multiprocessor (SMP), such as Sun UE1000, processors have uniform access to memory independent of the processor or the memory address. Similarly, an input/output (I/O) driver running on any processor has uniform access to any I/O device in the system.

Many modern computer systems are not truly symmetrical. A typical example would be a system including central processor unit (CPU) nodes and I/O nodes connected to switches, which in turn connect through a fast network to other switches and nodes. All CPU nodes can access all I/O nodes, so the system is symmetrical to the extent required to run conventional OS. However, a CPU node can access an I/O node which is connected to the same switch as the CPU node more quickly than one connected to another switch. Conventional OS do not provide support for the concept of a CPU automatically accessing the closest appropriate resource (known as "processor affinity"). That is, they do not ensure that software running on a CPU node will always access an I/O node which is connected to the same switch as the CPU node. As a result, accesses from some CPU nodes have to cross a system interconnect to access a remote network interface controller (NIC), whereas an access to a local NIC could be used instead. This results in higher latencies for transmission over the network and unnecessary use of bandwidth on the system interconnect.

SUMMARY OF THE INVENTION

The present invention includes a distributed multi-node computer system comprising a plurality of central processor unit (CPU) nodes, input/output (I/O) nodes, and memory nodes connected via an interconnect (as shown in FIG. 1). The interconnect further comprises a plurality of interlinked switches. Each switch provides routing of data packets between CPU nodes, I/O nodes, and memory nodes. Each switch is connected through a corresponding I/O node to a NIC for transferring data packets on a network. Each NIC is memory-mapped. Part of the system address space forms a send window for each NIC connected to a corresponding switch (as shown in FIG. 2). A CPU transmits data packets over the network by writing them to a NIC send window. A mechanism for controlling data packets transmission is defined such that each CPU write a to a NIC send window is atomic and self-defining, i.e., it does not rely on an immediately preceeding write determine where the data packet should be sent. The destination of the data packet and other properties of its transmission might be encoded within the data packet written to the send window. NICs connected to the switches in the system are configured to interpret CPU writes to send windows in the same way. This ensures that writing a data packet to the NIC send window will have the same effect whichever NIC it is written to. The well-known concept of "address aliasing" is used on part of the NIC send window so that the CPU writes to the aliased part of the send window are always directed to the NIC connected to the same switch as the CPU which does the writes. As a result, CPU writes to a NIC are directed to the NIC closet to a CPU regardless of which NIC software running on the CPU attempts to access. Accordingly, better performance is achieved in the distributed multi-node computer system.

DETAILED DESCRIPTION OF THE INVENTION

Figure 1:
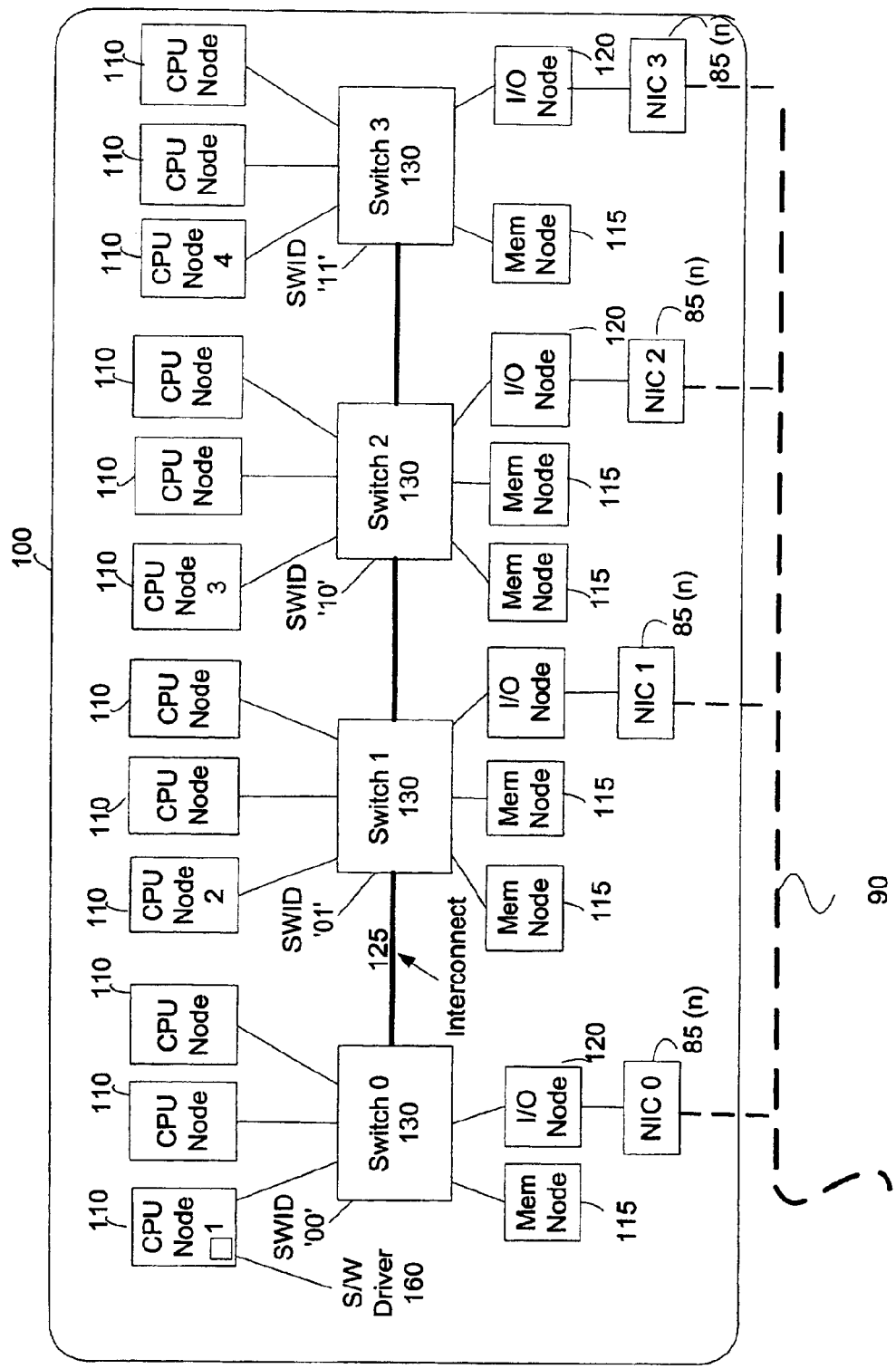
FIG. 1 is a block diagram of an overall architecture of a distributed multi-node computer system in accordance with an embodiment of the present invention.

Referring now to FIG. 1, there is shown a block diagram of an overall architecture of a distributed multi-node computer system 100 connected to an external network 90. System 100 includes a plurality of nodes: central processing unit (CPU) nodes 110a–100n (generally 110); memory nodes 115a–115n; and input/output ("I/O") nodes 120a–120n (120). Each CPU node 110 is a conventional processing unit, for example, an Intel or Intel-compatible Pentium™ class or higher processor, a Sun SPARC™ class or higher processor, or an IBM/Motorola PowerPC™ class or higher processor. Each I/O node 120 is a conventional I/O system, for example, a storage device, an input device, a peripheral device, or the like. Each memory node 115 is a conventional memory system, for example, a dynamic random access memory (DRAM) system, a static random access memory (SRAM) system, or the like. As shown in FIG. 1, nodes 110, 115, and 120 in system 100 are connected via an Interconnect 125. Interconnect 125 may be, for example, a mesh, a ring or a hypercube implemented using routers or switches. Interconnect 125 provides a path between any pair of nodes and routes a message from one node to another. Interconnect 125 further comprises a plurality of interlinked switches 130 (a)–(n) (generally 130), although only four switches 0, 1, 2, and 3 are shown for ease of explanation. Each switch 130 provides routing of data packets between CPU node 110, memory node 115, and I/O node 120.

Each switch 130 has a local switch ID (SWID) indicating the ID of switch 130 in the system 100. Each SWID may be determined by binary bits, which are either logical high or logical low. For example, as shown in FIG. 1, switch 0 has a SWID '00', switch 1 has a SWID '01', switch 2 has a SWID '10', and switch 3 has a SWID '11' accordingly. As shown in FIG. 1, switch 0 is connected to three CPU nodes 110, one memory node 115, and one I/O node 120. Switch 1 is connected to two CPU nodes 110, one I/O node 120, and one memory node 115. It should be noted that every node in system 100 has a switch 130 to which it is physically connected as well as a switch 130 to which it is not physically connected. Each CPU 110 has a non-symmetric access to switches to which CPU 110 is not directly connected. As an illustrative example, CPU node 110 marked as 1 is directly connected to switch 0. CPU node 1, however, is not directly connected to switches 1, 2, and 3. A detailed block diagram of one such switch 130 of the embodiment of FIG. 1 is shown below in FIG. 4.

Each switch 130 shown in FIG. 1 is connected through a corresponding I/O node 120 to a NIC 85(n) (generally 85). As shown in FIG. 1, switch 0 connects through a corresponding I/O node to NIC 0, switch 1 connects through a corresponding I/O node to NIC 1, switch 2 connects through a corresponding I/O node to NIC 2, and switch 3 connects through a corresponding I/O node to NIC 3. Each NIC 85 is an I/O controller for a network interface such as Gigabit Ethernet or Fiber Channel.

System 100 further comprises a software driver 160 that causes CPU node 110 to issue a processor input/output (PIO) write reference to NIC 85. Software driver 160 can be implemented as software or hardware.

Figure 2:
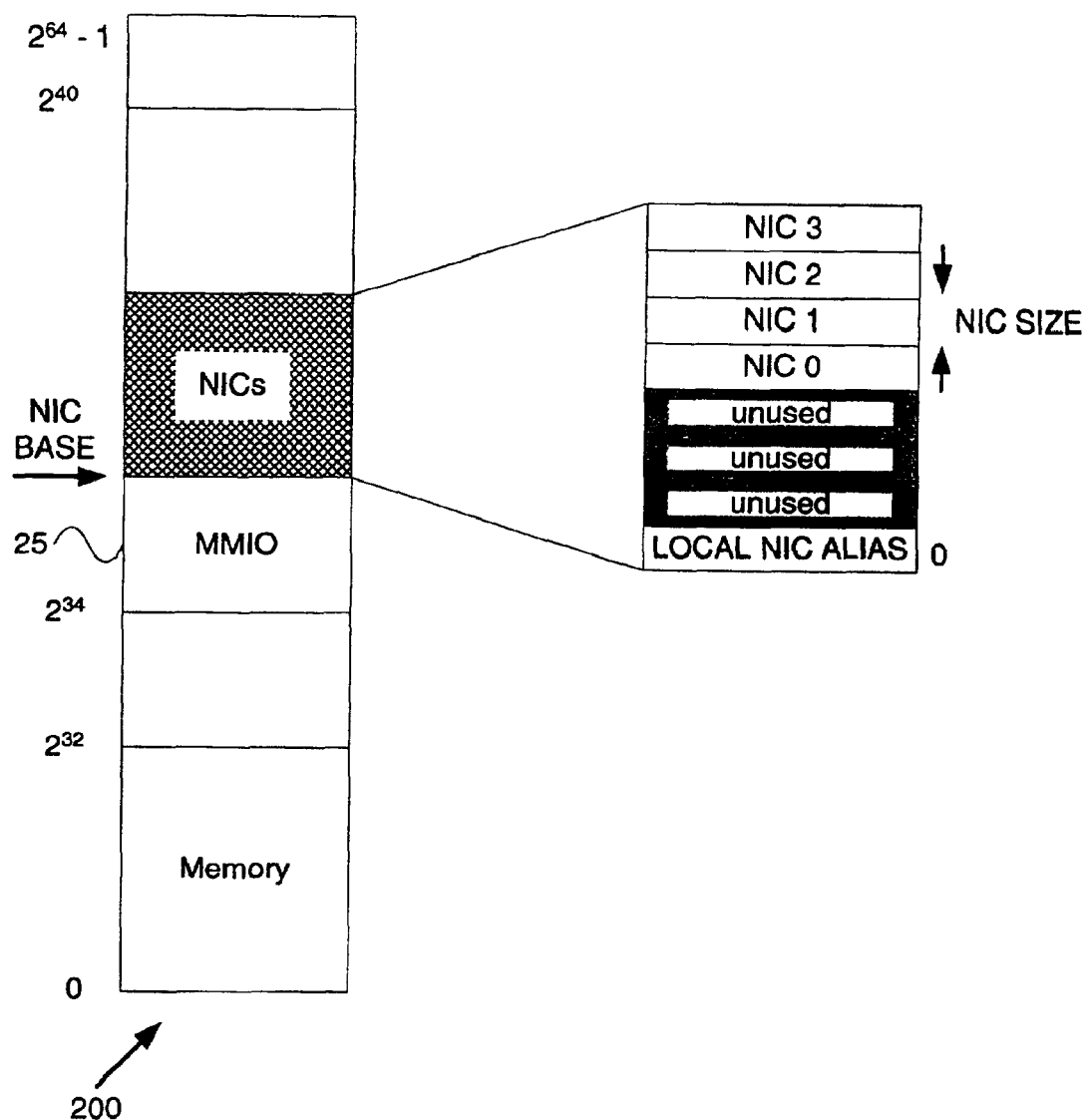
FIG. 2 is a pictorial illustration of an address map of the distributed computer system of FIG. 1.

Referring now to FIG. 2, it shows address map 200 of multi-node computer system 100. Address map 200 has a set of memory addresses for accessing memory structures, such as cached memory and I/O 120. As shown in FIG. 2, address map 200 starts at 0 and can be $2^{64}$ bits wide. In the example of FIG. 2, any address between 0 and $2^{32}$ maintains reference to memory node 115. Any address between $2^{34}$ and $2^{40}$ maintains reference to the memory-mapped input output (MMIO) window 25. All NICs 85 are mapped in address map 200. Part of the system address map 200 forms a send window for each NIC 85 connected to a corresponding switch 130. This address space is called NIC send window 27. It should be understood that in the address map 200 any address range might be chosen to maintain reference to various memory structures.

CPU 110 transmits data packets over the network 90 by writing them to NIC send window 27. A mechanism for controlling data packet transmission is defined such that each PIO write reference to NIC send window 27 is atomic and self-defining. That is, each PIO write does not rely on an immediately preceding PIO write to determine where the data packet should be sent. All the information required to transmit data packets is sent in a single PIO write to the NIC 85. As a way of an example, this information may include a network destination, a data packet, a protocol header, etc. The destination of data packets and other information might be encoded within the data packet written to the NIC send window 27. In an alternative embodiment, the destination of data packets may be indicated by the offset (not shown) within the NIC send window 27. In one embodiment of the present invention, a write combining attribute is used to send a data packet in a single transfer. It should be understood that other methods could be utilized to send a data packet in a single transfer to NIC 85. The NICs 85 connected to switches in the system 100 are configured to interpret writes to their send windows 27 in the same way. This ensures that writing a data packet to the NIC send window 27 will have the same effect whichever NIC 85 it is written to.

In the NIC window 27, regions labeled NIC 0, NIC 1, NIC 2, and NIC 3 are directly memory-mapped. As previously described, NIC 0 connects to switch 0 through a corresponding I/O node, NIC 1 connects to switch 1 through a corresponding I/O node, NIC 2 connects to switch 2 through a corresponding I/O node, and NIC 3 connects to switch 3 through a corresponding I/O node. A PIO write reference to the space labeled NIC 0 in NIC send window 27 will be routed directly to the NIC 85 attached to switch 0. Similarly, a PIO write reference to the space labeled NIC 2 will be routed directly to the NIC 85 attached to switch 2. A PIO write reference to a region in the NIC send window 27 labeled "LOCAL NIC ALIAS" will be routed to the NIC attached to the same switch as the CPU that issued the PIO write reference.

A region marked UNUSED is a hole in the address map 200 to allow the LOCAL NIC ALIAS area to be naturally aligned with NIC 0 window. As shown in FIG. 2, LOCAL NIC ALIAS starts at the bottom of the NIC window 27 in the MMIO window 25.

Figure 3:
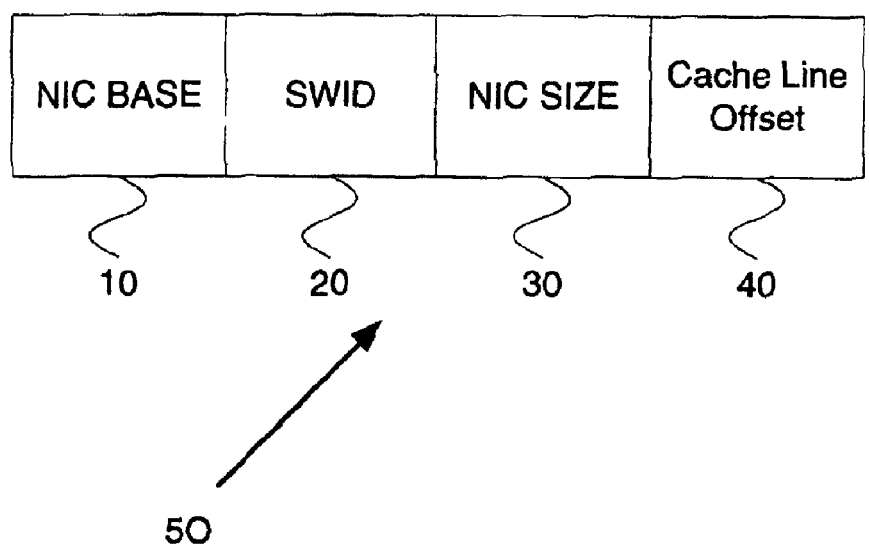
FIG. 3 is a pictorial illustration of a preferred format of an address used in a processor input/output (PIO) reference to a NIC.

Referring now to FIG. 3, there is shown a pictorial illustration of a preferred format of the address 50 used in a PIO write reference to NIC 85. Address 50 indicates where a data packet should be routed. Address 50 preferably includes the following fields: NIC BASE field 10; SWID field 20; NIC Size field 30; and Cache Line Offset field 40.

NIC Base field 10 is used to determine whether the PIO write reference is made to NIC 85 by comparing it to a NIC base register (not shown in FIG. 3). If the contents of NIC base field 10 match to the NIC base register, it indicates that the request is made to NIC 85. NIC base register 5 is described below in more detail in connection with FIG. 4.

SWID field 20 is preferably set to a specified value at system initialization time. In one embodiment, a specified value stored in SWID field 20 is zero "000". In one embodiment, the SWID field 20 is 3 bits wide. It should be understood that "000" is just an example value and the SWID field 20 can store any arbitrary number. When it is determined that the PIO reference is made to NIC 85, the SWID field 20 is examined to see if it has a specified value which indicates the Local NIC Alias.

NIC size field 30 specifies the size of the NIC send window 27 in the MMIO 25. NIC send window 27 is a power of 2 in size and is naturally aligned. Cache line offset 40 indicates the size of a cache line in the MMIO window 25.

Figure 4:
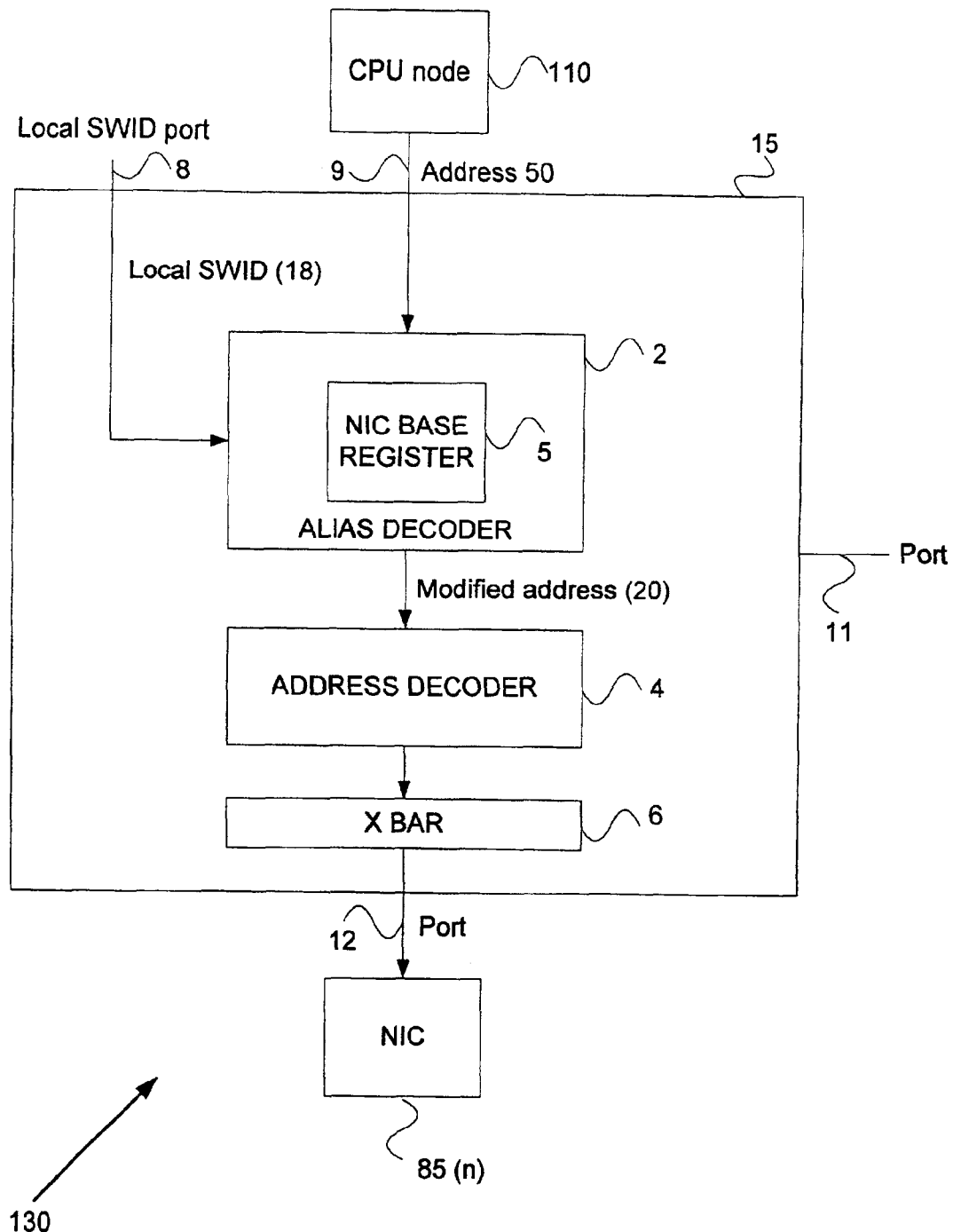
FIG. 4 is a functional block diagram of one switch of the system of FIG. 1.

Referring now to FIG. 4, it shows a functional block diagram of one switch 130 of system 100. Although a typical system 100 will have a plurality of switches 130, FIG. 4 illustrates only one such switch 130 for purposes of the clarity of this description. As shown in FIG. 4, switch 130 has several input ports, but only five ports 8, 9, 11, 12, and 15 are shown. Switch 130 further connects through a corresponding I/O node 120 to NIC 85.

Each switch 130 further comprises NIC base register 5. NIC BASE register 5 is programmed to indicate where the NICs 85 shown in FIG. 1 are mapped in the MMIO window 25.

Each switch 130 further comprises an alias decoder 2 adapted to decode address 50 used in a PIO write reference. Although only one alias decoder 2 is shown in FIG. 4 for ease of explanation, each port in switch 130 has alias decoder 2. Once it is determined that the PIO write reference is made to NIC 85, alias decoder 2 reads SWID field 20 of the address 50 to determine whether it has a specified value indicating a local NIC alias. If the address 50 indicates the local NIC alias in NIC send window 27, alias decoder 2 modifies the received address 50 by replacing SWID field of address 50 with a local SWID 18 received on the local SWID port 8. Alias decoder 2 forwards the modified address 50a to an address decoder 4.

Address decoder 4 is adapted to receive the modified address 50a and to route the data packet to the modified address 50a. Modified address 50a includes an address of a NIC local to the switch that is connected to CPU 110 that issued the PIO write reference. As an illustrative example, if CPU 110 connected to switch 1 issued the PIO write reference, the reference will be routed to NIC 1 connected to switch 1. Switch 130 further comprises a crossbar (XBAR) 6, coupled to the address decoder 4. XBAR 6 routes PIO write requests from one port to another.

Figure 5:
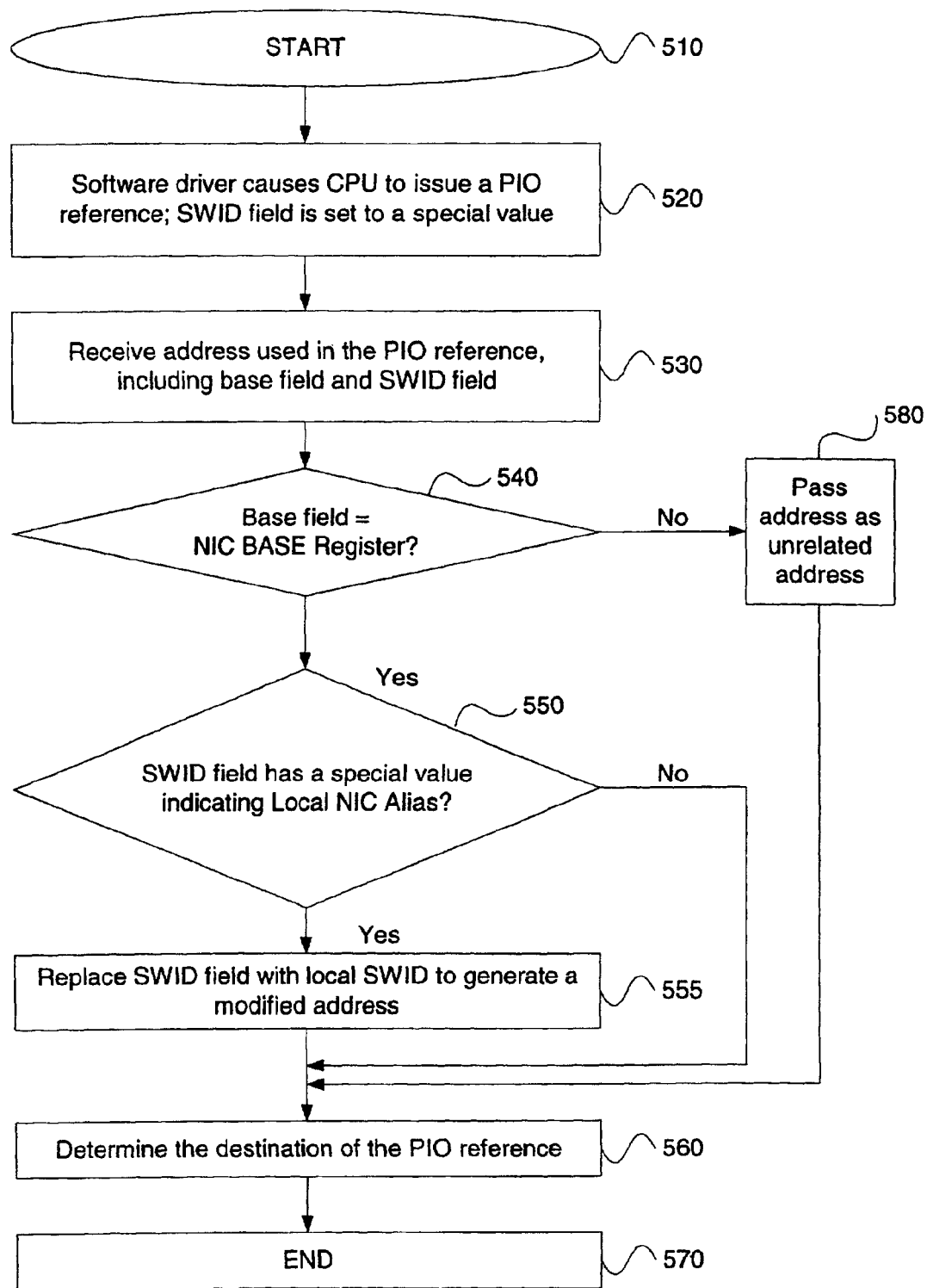
FIG. 5 is a flow chart of a method for decoding a destination of the PIO reference performed by the system of FIG. 1.

Referring now to FIG. 5, there is shown a flow chart of a method for routing a data packet performed by system 100. The process starts 510 and software driver 160 causes 520 CPU 110 to issue a PIO write references to NIC 85. PIO write reference preferably includes address 50 as well as a data packet. Software driver 160 preferably sets the SWID field 20 to a specified value in the address 50 used in the PIO write reference. The specified value indicates the local NIC alias in NIC send window 27 (shown in FIG. 2). All the information required to transmit a data packet must be sent in a single PIO write reference to NIC 85 and is encoded within the data packet.

The PIO write reference arrives on port 9 of switch 130 (shown in FIG. 4). Alias decoder 2 receives 530 address 50 used in the PIO write reference. In step 540, a logical comparison is performed between NIC BASE field 10 and NIC BASE register 5. NIC BASE register 5 indicates where NICs 85 are mapped in the MMIO window 25. If the contents of NIC BASE field 10 are equal to NIC BASE register 5, it indicates that the PIO write reference is made to NIC 85. The SWID field of the address 50 is then examined 550 to see if it has a specified value indicating a Local NIC Alias.

If the determination of the previous step is positive, alias decoder replaces 555 the SWID field of the address with local SWID 18 and generates modified address 50a (shown in FIG. 4). Modified address 50a preferably has the same fields as the received address 50. Modified address 50a indicates the address of a NIC local to a switch that is connected to the CPU 110 that issued the PIO write reference.

Address decoder 4 receives 560 the modified address having the local SWID, and routes the PIO write reference to its destination as indicated in the modified address 50a, and the process ends 570. As a result, the PIO write reference is routed to the NIC that is the closest to the CPU that issued the request, regardless of which NIC is targeted by the PIO write reference. If, however, the PIO write reference is not made to NIC 85, the address is passed 580 as unmodified to address decoder 4.

Thus, the present invention beneficially allows software driver 160 always to use the nearest NIC to the CPU it is currently running on, without the need to understand the topology of the system. The operating system may software driver 160 between CPUs without the software driver's 160 knowledge, but each independent transfer of a data packet to the network 90 will always go through the NIC connected to the switch to which the current CPU is connected.

What is claimed is:

1. In a multi-node computer system including a plurality of CPUs communicatively coupled to a plurality of switches, each switch communicatively coupled to at least one network interface controller (NIC), a method for routing a processor input/output (PIO) write reference from a CPU to a NIC connected to a switch that is local to the CPU, the method comprising:
   receiving the PIO write reference, the reference including data and address having a base field;
   comparing arm the base field of the address with a value of a NIC base register to determine whether the PIO write reference is made to the NIC;
   responsive to the address indicating a local NIC alias, generating a modified address, based on the address, the modified address including an address of a NIC local to a switch that is connected to the CPU that issued the PIO write reference; and
   routing the data to the modified address.

2. In a multi-node computer system including a plurality of CPUs communicatively coupled to a plurality of switches, each switch communicatively coupled to at least one network interface controller (NIC), a method for routing a processor input/output (PIO) write reference from a CPU to a NIC connected to a switch that is local to the CPU, the method comprising:
   receiving the PIO write reference, the reference including data and address having a switch ID (SWID) field;
   responsive to the address indicating a local NIC alias, generating a modified address by replacing the SWID field with a local SWID of a NIC local to the switch that is connected to the CPU that issued the PIO write reference; and
   routing the data to the modified address.

3. A multi-node computer system comprising:
   a plurality of CPUs for issuing a PIO write reference, each reference including an address;
   a plurality of switches, each switch communicatively coupled to at least one CPU for routing the PIO write reference to a network interface controller (NIC);
   a plurality of NICs, each NIC communicatively coupled to at least one of the plurality of switches for routing the PIO write reference on a network; and
   a plurality of alias decoders, each alias decoder residing in one of the plurality of switches, for generating a modified address based on the address, the modified address including an address of a NIC local to a switch that is connected to the CPU that issued the PIO write reference.

4. The system of claim 3, further comprising a plurality of address decoders, each address decoder residing in one of the plurality of switches, for routing the PIO write reference to the modified address.

5. The system of claim 3, wherein the address used in the PIO write reference further comprises a size field indicating a number of cache lines that can be write in a memory-mapped input/output (MMIO) window.

6. The system of claim 3, wherein the address used in the PIO reference further comprises a cache line offset field indicating the size of each cache line written in an MMIO window.

7. The system of claim 3, wherein each switch further comprise a NIC base register for indicating where the NICs are mapped in an MMIO window.

8. The system of claim 7, wherein the NIC base register stores a programmed constant.

9. The system of claim 3, wherein each switch is capable of recognizing the PIO write reference to the MMIO window in any switch.

10. The system of claim 3, wherein each PIO write reference to a NIC includes all information required for the NIC to send data to its destination.

11. In a multi-node computer system including a plurality of CPUs communicatively coupled to a plurality of switches, each switch communicatively coupled to at least one network interface controller (NIC), a method for routing a processor input/output (PIO) write reference from a CPU to a NIC connected to a switch that is local to the CPU, the method comprising:

receiving the PIO write reference, including an address, the address including a base address and a switch ID (SWID);

comparing the base address with a NIC base register to determine whether the PIO write reference is made to a NIC;

responsive to the PIO write reference being made to the NIC, determining whether the SWID has a specified value indicating a local NIC alias; and responsive to the SWID having a specified value indicating a local NIC alias, replacing the SWID field with a local SWID.

12. The method of claim 11, wherein each PIO reference includes a data packet, and wherein each PIO reference to a NIC includes all the information required for the NIC to send the data packet to its destination.

13. The method of claim 11, wherein the local SWID is an ID of the switch connected to the CPU that issued the PIO write reference.

14. The method of claim 11, wherein the local NIC alias is a region in an MMIO window that allows the PIO write reference to be routed to the NIC connected to a switch local to the CPU that issued the reference.

15. A distributed multi-node computer system comprising:

processor means for issuing a processor input/output (PIO) write reference, the PIO write reference including an address having a base field; and alias decoding means for receiving the address used in the PIO write reference, for comparing the base field of the address with a value of a network interface controller (NIC) base register to determine whether the PIO write reference is made to an address of a NIC, and for generating a modified address, based on the received address, responsive to the address indicating a local NIC alias, the modified address indicating the address of the NIC connected to the a switching means local to the processor means that issued the PIO write reference; and address decoding means residing in the switching means, for routing the PIO write reference to the modified address.

* * * * *

UNITED STATES PATENT AND TRADEMARK OFFICE
CERTIFICATE OF CORRECTION

PATENT NO. : 6,862,634 B2 Page 1 of 1
DATED : March 1, 2005
INVENTOR(S) : Jeremy J. Farrell et al.

It is certified that error appears in the above-identified patent and that said Letters Patent is hereby corrected as shown below:

Column 6,
Line 8, please remove "arm" after "comparing";
Line 60, please replace "comprise" with -- comprises --; and Column 8,
Line 21, please remove "the" after "to".

Signed and Sealed this

Twenty-fourth Day of May, 2005

JON W. DUDAS
*Director of the United States Patent and Trademark Office*